(12) United States Patent
Cunningham et al.

(10) Patent No.: US 9,366,215 B2
(45) Date of Patent: Jun. 14, 2016

(54) SYSTEMS AND METHODS FOR DRIVING INTENTION PREDICTION IN VEHICLES

(71) Applicant: Cummins, Inc., Columbus, IN (US)

(72) Inventors: Michael J. Cunningham, Greenwood, IN (US); Govindarajan Kothandaraman, Columbus, IN (US); Nassim Khaled, Columbus, IN (US); Yu Liu, Novi, MI (US); Aniket Gupta, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 185 days.

(21) Appl. No.: 14/307,886

(22) Filed: Jun. 18, 2014

(65) Prior Publication Data
US 2015/0369197 A1    Dec. 24, 2015

(51) Int. Cl.
*F02N 11/08* (2006.01)
(52) U.S. Cl.
CPC .................................. *F02N 11/0803* (2013.01)
(58) Field of Classification Search
CPC . F02N 11/0803; F02N 11/0811; F02N 19/02; F02N 19/06; F02D 41/064; F01N 3/2006
USPC ........ 123/179.3, 179.6, 179.2, 685, 697, 491, 123/543, 549, 142.5 R; 701/102, 113; 60/286, 300, 303, 320
See application file for complete search history.

(56) References Cited

U.S. PATENT DOCUMENTS

| | | | |
|---|---|---|---|
| 7,603,227 B2 | 10/2009 | Watanabe et al. | |
| 7,620,491 B2 | 11/2009 | Watanabe | |
| 7,818,960 B2 * | 10/2010 | Gonze | F01N 3/2013 60/284 |
| 8,413,423 B2 * | 4/2013 | Roos | F01N 3/101 180/65.265 |

FOREIGN PATENT DOCUMENTS

JP     2004-340028     12/2004

* cited by examiner

*Primary Examiner* — Hai Huynh
(74) *Attorney, Agent, or Firm* — Foley & Lardner LLP (57) ABSTRACT

Disclosed are methods, systems, and computer-readable mediums for predicting a driving intention of a driver of a vehicle. A sequence comprising a plurality of indicators is detected, where each indicator suggests intent to drive a vehicle. A separation time between each of the indicators of the sequence is determined. The sequence and determined separation times are compared to historical data, where the historical data comprises data related to previously stored separation times of the sequence. Based on the comparison, a confidence level that an engine of the vehicle will be started is determined. Based on the confidence level, a feature of the vehicle is activated.

20 Claims, 4 Drawing Sheets

SYSTEMS AND METHODS FOR DRIVING INTENTION PREDICTION IN VEHICLES

BACKGROUND

Evolving emissions regulations, especially for light duty vehicles, require aftertreatment devices to be effective as quickly as possible. Typically upon a cold start, there is insufficient heat generated from the engine over the first several minutes of operation, so auxiliary heating devices are often employed in this time period. Since these devices take some time to reach their operating temperatures as well, it is desirable to activate such devices before the vehicle is started so that the aftertreatment and engine emissions are controlled as early as possible when the vehicle begins operation.

SUMMARY

Disclosed herein are methods, systems, and computer-readable media for driving intention prediction in vehicles. One embodiment relates to a method that comprises detecting, using a processing device, a sequence comprising a plurality of indicators, wherein each indicator suggests an intent to drive a vehicle. The method further comprises determining a separation time between each of the indicators of the sequence, and comparing the sequence and determined separation times to historical data, wherein the historical data comprises data related to previously stored separation times of the sequence. The method further comprises determining, based on the comparison, a confidence level that an engine of the vehicle will be started, and activating, based on the confidence level, a feature of the vehicle.

Another embodiment relates to a system for driving intention prediction in a vehicle. The system comprises one or more computing devices configured to detect a sequence comprising a plurality of indicators, wherein each indicator suggests an intent to drive a vehicle. The one or more processors are further configured to determine a separation time between each of the indicators of the sequence, and compare the sequence and determined separation times to historical data, wherein the historical data comprises data related to previously stored separation times of the sequence. The one or more processors are further configured to determine, based on the comparison, a confidence level that an engine of the vehicle will be started, and activate, based on the confidence level, a feature of the vehicle.

Another embodiment relates to a method that comprises detecting, using a processing device, a sequence comprising a plurality of indicators, wherein each indicator suggests an intent to drive a vehicle. The method further comprises determining a separation time between each of the indicators of the sequence, and determining whether the sequence has a corresponding entry in historical data, wherein the historical data comprises data related to previously stored separation times of stored sequences. Responsive to determining that the sequence does not have an entry in the historical data, the sequence is inserted in the historical data. Responsive to determining that the sequence has an entry in the historical data, the historical data of the sequence is updated based on the separation time between each of the indicators of the sequence. The method further comprises determining, based on the sequence, a confidence level that an engine of the vehicle will be started, and activating, based on the confidence level, a feature of the vehicle.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are techniques for driving intention prediction in vehicles. In general, the disclosure herein allows for the early prediction of a driver's intent to operate a vehicle soon thereafter, before the driver turns on the engine of the vehicle. Various driving indicators that suggest a driving intention are monitored to determine whether it is probable that the driver will soon operate the vehicle. When it is determined that it is likely that the driver will operate the vehicle, various cold start facilitating devices/features and aftertreatment devices/features (e.g., exhaust treatment systems, etc.) can be automatically activated, calibrated, or adjusted, even before the engine is started. This is because during the first time period of running a cold started engine, a vehicle's emissions are typically the highest. By operating cold start devices and aftertreatment devices in the manners disclosed herein, the engine may operate more efficiently and effectively. As a result, the emissions produced during this period may be reduced and aftertreatment devices may better treat remaining emissions. Additionally, cold start devices and aftertreatment devices may be more efficiently activated such that battery drain is minimized before the engine is turned on. For example, glow plugs, engine grid heaters, or exhaust system heaters may be activated at an ideal time prior to the start of the engine. As another example, an aftertreatment device that combines a diesel particulate filter with a selective catalytic reduction catalyst to remove particulate matter may be calibrated and activated so that emissions are properly treated as soon as the engine is started. Other cold start features and aftertreatment devices may also be activated and controlled, and the scope of the present disclosure is not limited to certain cold start features or aftertreatment devices. In some embodiments, other non-aftertreatment devices may also be activated and controlled by the techniques disclosed herein. There are several sensors and indicators available on vehicles that can be used to detect when a vehicle operator intends to operate a vehicle, and such sensors and indicators can be used to activate such devices even before the engine is started.

Various driving indicators may be selected to be monitored by the systems disclosed herein. These include, but are not limited to: a remote key being activated or within a certain proximity from the vehicle, a driver door switch/latch being open, a driver door switch/latch being closed, the status of an ignition key switch, and the driver seatbelt buckle status. The driving indicators can be monitored for transitions from one indicator to another, and the separation time between indicators may be determined. Each sequence of these driving indicators and transition times may be recorded until the engine cranks. When the engine cranks, the previous sequence and timing information may be stored as a pattern that indicates a driving intention. Thus, when a driver enters or nears a vehicle, the current sequence may be compared to previously stored patterns in order to predict if the driver will indeed turn on the engine.

To monitor such indicators, an algorithm can be employed that may be initiated by activity from various sensors/devices on a vehicle's communication network. For example, activity can be detected on a vehicle's CAN (controller area network) bus. In general, the CAN bus is a vehicle bus standard that allows microcontrollers and other devices to communicate within a vehicle. Devices that are typically connected by a CAN bus include sensors, actuators, and other control devices. As discussed above, the algorithm includes monitoring several pre-specified indicators that suggest a driving intention, such as opening and closing the driver side door, remote key unlocking, key switch status, seatbelt buckle switch, etc. In response determining a driving intention, various devices/features of the vehicle may be activated (e.g., any devices capable of being controlled via the CAN bus, etc.). In one embodiment, these devices include aftertreatment devices. In other embodiments, other non-aftertreatment devices may be controlled or otherwise activated. As one example, comfort related features (e.g., a cabin heater device, a cabin air conditioning devices, a seat heating or cooling device, etc.) or driver related settings (e.g., radio settings, seat positioning settings, etc.) may also be controlled or activated.

Figure 1:
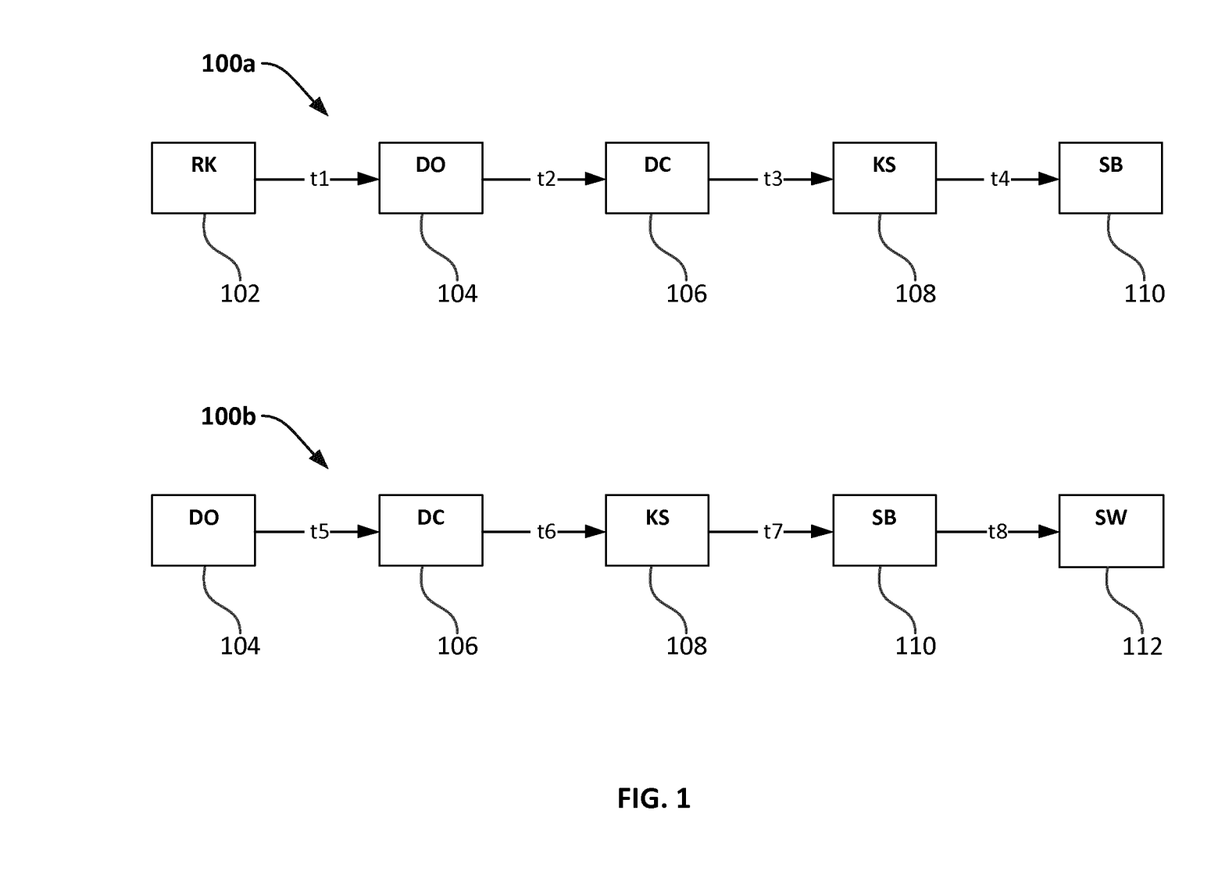
FIG. 1 shows a block diagram of example patterns of driving intention indicators, according to an embodiment.

Referring to FIG. 1, examples patterns 100a and 100b of indicators are shown, according to an embodiment. As depicted, pattern 100a consists of the remote key unlocking the door(s) (RK) 102, followed by the driver side door opening (DO) 104 after time t1. A lock sensor coupled to one or more locks, or a control/security system of the vehicle may be used to read the status of the locks and detect the remote key. Pattern 100a further includes the driver side door closing (DC) 106 after time t2 since the driver side door opened (DO) 104. The key switch status (KS) 108 (e.g., placing the key in the ignition, turning the key forward to an accessory position, etc.) then changes after time t3 since the driver door closed (DC) 106. Lastly, the driver seatbelt buckle is engaged (SB) 110 (e.g., by monitoring the seatbelt buckle switch position, etc.) after time t4 since the key switch status (KS) changed.

As indicated, pattern 100b is similar to pattern 100a, however the remote key unlocking the door(s) (RK) 102 is not required, and the timing between indicators is different. Pattern 100b includes the driver side door opening (DO), the driver side door closing (DC) after time t5, the key switch status (KS) changing after time t6, and the driver seatbelt buckle being engaged (SB) after time t7. Additionally, the weight of the driver sitting on the seat (SW) 112 may be required to be detected after time t8. For example, one or more pressure/weight sensors may be embedded in one or more seats (or the seat housing/frame of the vehicle) in order to detect the weight of the driver sitting in the seat. A certain minimum weight, a specific weight, or a weight range, may be required to be detected, and the weight may be required to be detected within a certain amount of time since a prior indicator has occurred.

The sequences of the indicators (e.g., patterns 100a and 100b) and the separation times (e.g., t1, t2, t3, t4, t5, t6, t7, t8) between indicators are recorded until the engine is started. A counter may then be assigned to each indicator pattern and a distribution of the separation times for each iteration of the pattern is formed over time. As the indicators are monitored, a sequence is formed and compared to historical data, and a confidence level is determined which indicates the overall likelihood (i.e. probability) of the engine being started relatively soon. For example, if the current sequence of indicators matches part of a pattern that appears often in the historical data, and the separation times are within stored distributions, the confidence level will be high. In one embodiment, based on a high confidence, a higher heating power of engine grid heaters or glow plugs can be activated without over-draining the battery (since it is probable the engine will start soon, which will replenish the used battery energy). However, if the sequence does not match historical data, or if the separation times do not fall into usual distributions, a lower confidence level is determined. In one embodiment, a lower confidence indicates that the engine will not likely be started soon and the heating strategy (e.g., activating the grid heater or glow plugs, etc.) is configured in a manner to better preserve the battery power. In this situation, any cold start features or aftertreatment devices are not fully activated (or not activated at all) until a higher confidence level is determined or the engine is started. In one embodiment, the confidence level required to activate any of the cold start features or aftertreatment devices is based on specific thresholds for each of the various cold start features and aftertreatment devices. In another embodiment, the confidence level required to activate any of the cold start features or aftertreatment devices is based on general thresholds, which may apply to groups of or all of the cold start features and/or aftertreatment devices.

Figure 2:
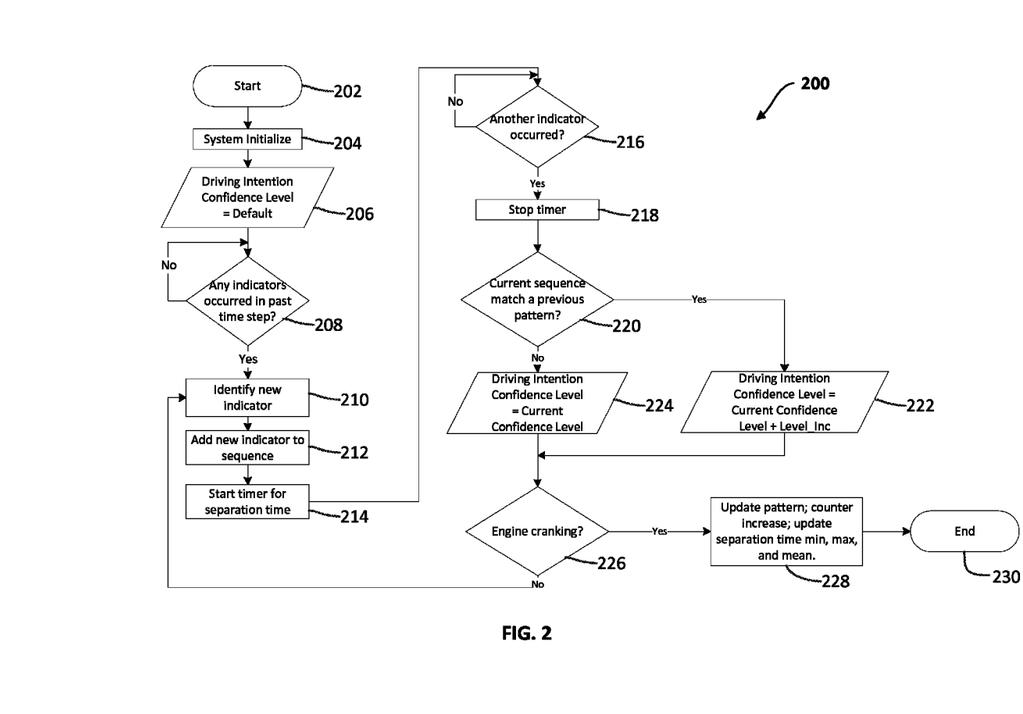
FIG. 2 shows a block diagram of an algorithm for driving intention prediction, according to an embodiment

Referring to FIG. 2, a flow diagram of algorithm 200 for driving intention prediction in vehicles is shown, according to one embodiment. In alternative embodiments, fewer, additional, and/or different steps may be performed by algorithm 200. Also, the use of a flow diagram is not meant to be limiting with respect to the order of steps performed by algorithm 200. The algorithm starts (202) and the system is initialized (204). Initializing the system may include any steps necessary to bring the system online. For example, the system may include a vehicle's engine control unit (ECU) or another processing device configured to implement the algorithm, and the system may be initialized when it is receiving power, appropriate memory is allocated, and a connection with the CAN bus of the vehicle is established, etc. After the system is initialized a driving intention confidence level may be set to a default level (206). The default confidence level may be set based on a configuration setting. The system monitors for indicators and detects whether any indicators have occurred during a previous time step (208) (e.g., during the previous millisecond, second, 3 seconds, etc.). If no indicators have occurred, then the system waits another time step and again checks for indicators. The time step amount may be specified by a configuration setting or may be based on a processor speed, current processing load, etc. If an indicator is detected during a time step, then the system identifies the indicator (210), adds the indicator to the current sequence (212), and starts a timer to determine the separation time (214) until either another indicator occurs or the engine turns on (e.g., begins cranking). The timer may increment at a precision that may be specified by configurations settings (e.g., seconds, milliseconds, etc.).

As the timer increments, the system checks to determine whether an additional indicator has occurred (216), and the system can loop if an indicator has not occurred. If an additional indicator is detected, the timer is stopped (218) and it is determined whether the current sequence (based on the current indicator(s) and time separation(s) between the current indicator(s)) matches a previous pattern. In one embodiment, previous patterns are stored in a historical table of data, including information related to indicator separation time distributions. Such a pattern table may be utilized to store all feasible sequences of driving indicators. For example, some of the indicator combinations are generally not feasible (or are highly unlikely), such as a sequence where the ignition key switch occurs earlier than a door opening, etc. In one embodiment, the infeasible sequences are not recorded in the pattern table. In one embodiment, the historical data is pre-populated with default patterns of driving indicators and the typical time distributions related to the patterns.

A portion of an example pattern table is provided below in TABLE 1:

TABLE 1

| Patterns | Counter | Separation Time Distribution | | | |
|---|---|---|---|---|---|
| | | t1 | t2 | t3 | t4 |
| RK->DO->DC->KS->SB | 253 | Range = [1 s, 40 s]<br>Mean = 6 s | Range = [2 s, 6 s]<br>Mean = 12 s | Range = [5 s, 20 s]<br>Mean = 10 s | Range = [2 s, 5 s]<br>Mean = 3 s |
| DO->DC->KS->SB | 145 | Range = [5 s, 10 s]<br>Mean = 6 s | Range = [5 s, 25 s]<br>Mean = 12 s | Range = [3 s, 8 s]<br>Mean = 5 s | N/A |
| . | . | . | | . | |
| . | . | . | | . | |
| . | . | . | | . | |

As depicted in TABLE 1, a first pattern includes the remote key unlocking the doors (RK), followed by the driver door opening (DO), followed by the driver door closing (DC), followed by the ignition key switch engaging (KS), and followed by the seat belt engaging (SB). The separate time distribution values can be described by minimum, maximum, as well as mean values. The individual separation values for each iteration of a pattern (e.g., specific values of t1, t2, t3, and t4 for an iteration) may also be stored (not reproduced in TABLE 1). As shown, the first pattern has occurred 253 times, where the range of separation times and the mean time between the indicators of the first pattern are specified by the values stored in the columns for t1, t2, t3, and t4, respectively. If a separation time between indicators is within the range defined by [minimum value, maximum value], it can be concluded that the transition falls into the usual distribution, and the confidence level may be appropriately set. In the first pattern above, the minimum time recorded between activating the remote key (RK) and then opening the driver door (DO) was 1 second. The maximum time recorded from activating the remote key (RK) and then opening the driver door (DO) was 40 seconds. The mean time between activating the remote key (RK) and opening the driver door (DO) is 6 seconds. Data is similarly stored for each of the other indicator transitions of the first pattern. The current sequence is analyzed to determine if it matches a previous pattern (220), and the separation time(s) of the current pattern are compared to the distribution values to determine a degree of a match. For example, if the separation time of a transition is close to a stored mean value (i.e. if the difference between the separation time and the mean is less than a certain threshold), the confidence level for the current pattern can be increased even further, as the current pattern is closer to the most frequently encountered values for the pattern.

Also as shown, a second pattern includes the driver door opening (DO), followed by the driver door closing (DC), followed by the ignition key switch engaging (KS), and followed by the seat belt engaging (SB). The second sequence has occurred 145 times, where the ranges of separation times and the mean times between indicators are specified by the values stored in columns t1, t2, and t3, respectively. For example, the minimum time recorded from opening the driver door (DO) to closing the driver door (DC) was 5 seconds, and the maximum was 10 seconds. The mean time between opening the driver door (DO) to closing the driver door (DC) is 6 seconds. Data is also stored for each of the other indicator transitions of the second pattern.

Referring again to FIG. 2, if the current sequence matches a previous pattern (220), the confidence level of the current sequence can be incremented (222) by a certain amount. In one embodiment, the confidence level is incremented by an amount specified by Level_inc, which may be based on a configuration setting. Additionally, if the separation time of the current indicators is close to a stored mean value for an indicator transaction of a pattern (see TABLE 1), the confidence level may be further incremented (e.g., Level_inc may be increased further, or an additional incremental value may be added to the current confidence level, etc.). In general, when a sequence fully matches one of a frequently occurring pattern, the confidence level would be the highest. However, if the current sequence does not match a previous pattern (220), then the confidence level is not incremented and remains at the current confidence level (224). In one embodiment, the cold start and aftertreatment devices can be activated with respect to a confidence level. For example, when a sequence matches a pattern in a manner where the confidence level is very high, the cold start and aftertreatment devices may be activated (e.g., heated up, supplied energy, etc.) at a strength corresponding to level of confidence. In another embodiment, other devices of the vehicle are activated in addition to, or instead of the aftertreatment devices. For example, driver comfort related features, or other devices may be activated.

At any time, algorithm 200 may be interrupted when the engine turns on (226). Alternatively, additional interrupts may be provided so that the system does not continuously run algorithm 200 (e.g., a timeout interrupt, etc.). In one embodiment, the system is configured to run algorithm 200 based on a certain schedule (e.g., during typical business hours, etc.). When the engine begins cranking (226), the current pattern is updated to indicate the completion of the pattern (228) and the pattern's distribution information may be saved. For example, a currently running separation timer may be disregarded, and the remaining indicator/timing data may be stored. If the current pattern is a new pattern that has not yet been stored in the historical data, the current pattern can be newly inserted into the historical data table. In this instance, the min, max, and mean values may be based on the newly inserted pattern, and the counter may be set to "1". Insertion of new patterns may also be based on certain requirements. For example, a pattern may be required to consist of a certain minimum number of indicators before the pattern is stored. Additionally, a pattern may be stored along with data linking the pattern to a particular driver (e.g., a driver's ID number, etc.). For example, an RFID tag of the driver or information provided by the driver's key may be used to obtain a driver's credentials. As another example, a driver's credentials/identification information may be acquired via accessing a remote database (e.g., a vehicle scheduling system, etc.) that was used to assign a driver to the vehicle, etc. If the pattern already exists in the historical data, the counter, min, max, and mean values are each updated based on the recorded separation timers of the current pattern, where applicable. After the pattern data is stored and/or updated (e.g., storing the indicator types, separation times, max, min, mean, counter, driver information, etc.), algorithm 200 may end (230).

In one embodiment, a forgetting function is applied to algorithm 200 such that only the patterns that have occurred in the past certain time period are stored. The particular time period may be based on configuration settings, and stored iterations of patterns that have a date that is older than that specified by the time period can be purged from the historical data. When a stored iteration is removed from the historical data, the max, min, mean, and counter values may also be updated to reflect that data has been removed. Alternatively, a pattern may have a date corresponding to the last date on which the pattern was detected, and an entire pattern and all related data may be removed from historical data based on this date (e.g., if the date is older than a certain threshold date). This functionality increases the algorithm's adaptability to driver pattern changes over time, for example, when a new driver is added for the vehicle. As another example, the forgetting functionality can be implemented by setting an upper limit on a counter for a pattern, and the oldest stored iterations of a pattern may be removed in order to store data for a newer iteration of the pattern.

Figure 3:
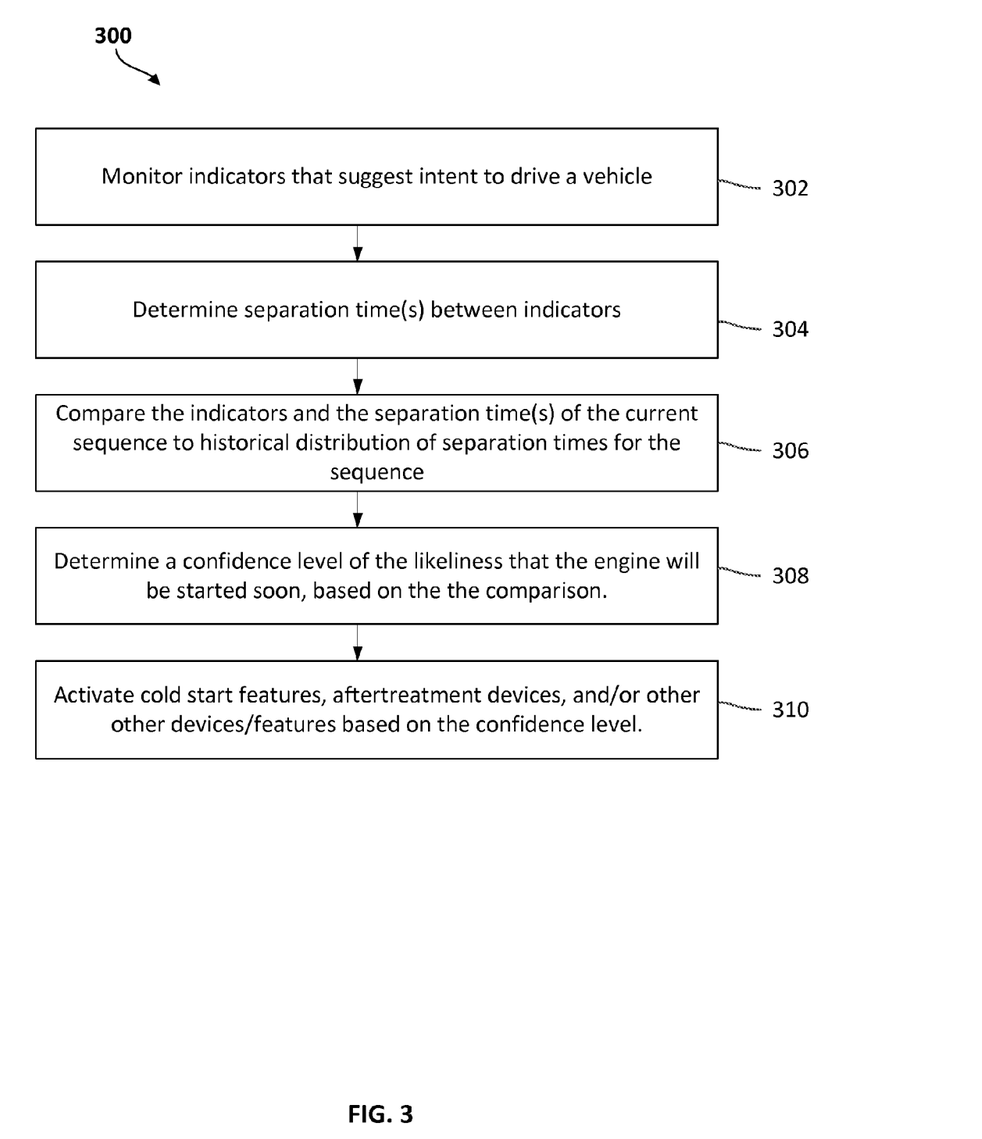
FIG. 3 is a flowchart of a process for driving intention prediction, according to an embodiment.

Referring to FIG. 3, a flow diagram of a process 300 for driving intention prediction in vehicles is shown, according to an embodiment. In alternative embodiments, fewer, additional, and/or different steps may be performed. Also, the use of a flow diagram is not meant to be limiting with respect to the order of steps performed. Process 300 includes monitoring indicators that suggest intent to drive a vehicle (302). For example, a vehicle's CAN bus may be monitored to detect these indicators. Such indicators may include one or more of the following: driver's side door opening, driver's side door closing, a remote key unlocking the door or within a certain range of the vehicle, an ignition key switch status, a seat belt buckle status, etc. Other indicators may also be monitored. Additionally, new indicators to be monitored may be added at any time. The separation time(s) between each detected indicator is determined (304) as new indicators are detected. For example, the time separation between the driver's door opening and closing may be 4 seconds (or 4000 milliseconds), etc. The indicators and the separation time(s) of current sequence of indicators are compared to historical distribution data including separation times for the sequence (306). For example, if the current sequence includes the driver's door opening (DO), the driver's door closing (DC), and then the driver's seat belt being fastened (SB), the current sequence may be compared to historical DO->DC->SB data, and the current separation times between these indicators may be compared to the max, min, and mean separation times in the historical data. Based on how the separation times and indicators of the current sequence compared to historical data, a confidence level will be determined (308). The confidence level represents the probability that the engine of the vehicle will soon be started. Based on the confidence level, various cold start features, aftertreatment devices, and/or other vehicle devices/features (e.g., driver comfort features) are selected and activated (310). The degree of activation may be proportional or otherwise based on the confidence level. For example, for a high confidence level (which may be compared to a certain threshold), an engine block heater may be activated at a maximum heat setting. For a lower confidence level, the engine block heater may be activated at a lower heat setting. For a very low confidence level, the engine block heat may not be activated at all.

Figure 4:
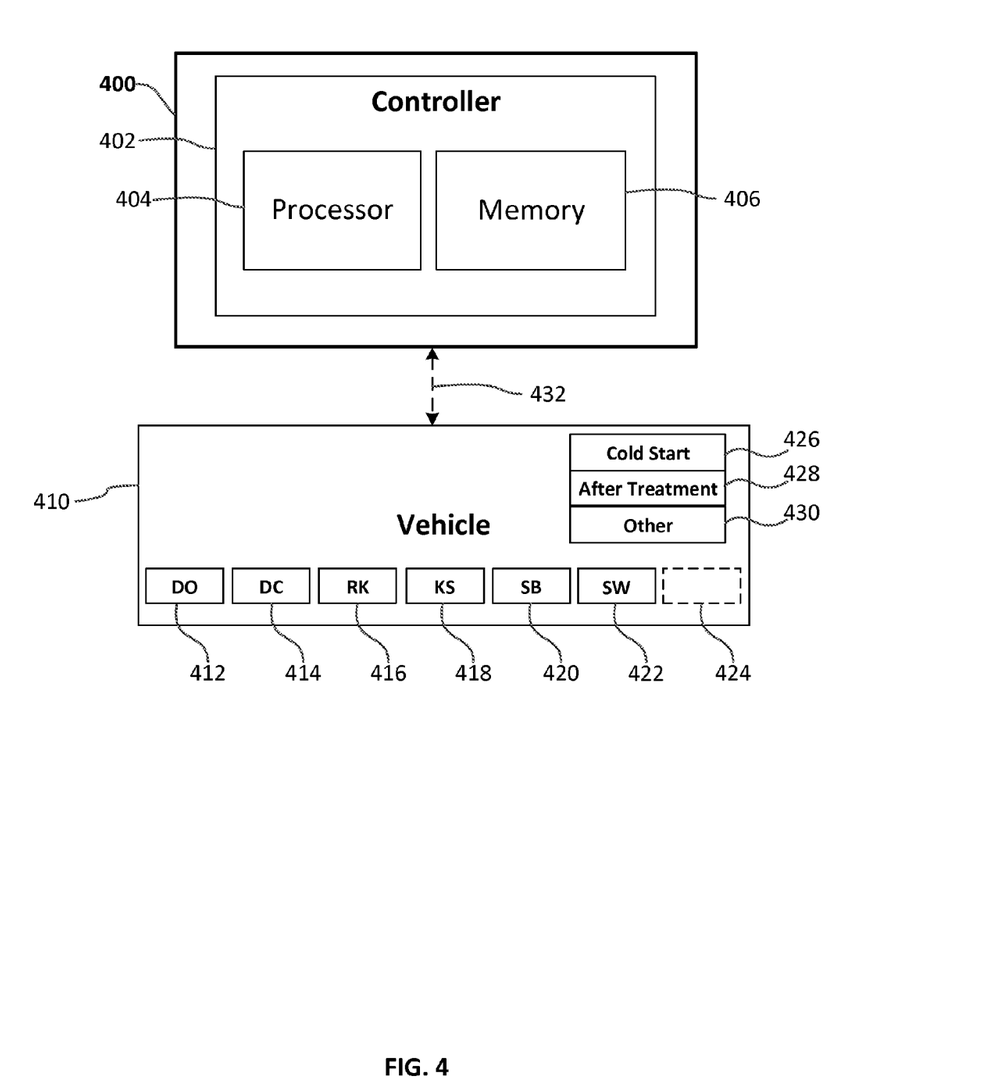
FIG. 4 is a block diagram of a system for implementing the techniques disclosed herein, according to an embodiment.

FIG. 4 shows system 400 that may be used to implement the techniques and methods described herein for driving intention prediction. System 400 typically includes a controller 402 having at least one processor 404 coupled to a memory 406. Processor 404 may be any commercially available CPU or engine control unit (ECU). Processor 404 may represent one or more processors and may be implemented as a general-purpose processor, an application specific integrated circuit (ASIC), one or more field programmable gate arrays (FPGAs), a digital-signal-processor (DSP), an engine control unit (ECU), a group of processing components, or other suitable electronic processing components. Memory 406 may include random access memory (RAM) devices comprising a main storage of the controller 402, as well as any supplemental levels of memory, e.g., cache memories, non-volatile or back-up memories (e.g., programmable or flash memories), read-only memories, etc. In addition, memory 406 may include memory storage physically located elsewhere in system 400 or controller 402, e.g., any cache memory in the processor 404 as well as any storage capacity used as a virtual memory, e.g., as stored on a mass storage device, etc.

In certain embodiments, controller 402 forms a portion of a processing subsystem including one or more computing devices having memory, processing, and communication hardware. Controller 402 may be a single device or a distributed device, and the functions of controller 402 may be performed by hardware and/or as computer instructions on a non-transient computer readable storage medium, and functions may be distributed across various hardware or computer based components. In certain embodiments, controller 402 is part of the control system of a vehicle (e.g., controller 402 may be part of or form an engine control unit (ECU) or a CAN bus controller of vehicle 410). In other embodiments, controller 402 is separate from the ECU of a vehicle. For example, system 400 may be integrated into a standalone device that is configured to interface with various vehicle sensors and devices of vehicle 410 in order to implement the techniques disclosed herein.

In one embodiment, system 400 is integrated into vehicle 410, and controller 402 is a device that is configured to interface with sensors and the ECU of vehicle 410 via the connection 432 of the vehicle. In one embodiment, connection 432 is a CAN bus network of vehicle 410. Controller 402 monitors signals on the CAN bus in order to detect indicators of driver intention. For example, controller 402 may detect the driver's door opening (DO) 412, the driver's door closing (DC) 414, the remote key fob proximity or unlocking of doors (RK) 416, the ignition key switch status (KS) 418, the driver's seat belt status (SB) 420, a detected seat weight/pressure sensor value (SW) 422, and other indicators 424). Controller 402, via processor 404, determines the time separation between detected indicators in a sequence of indicators. Controller 402 compares the current sequence to historical sequence data (e.g., a pattern table or database of historical data stored in memory 406, etc.). Based on the closeness of a match to historical data, a confidence level is determined for the current sequence. The confidence level represents the likelihood that the engine of vehicle 410 will start soon thereafter. Based on the level of confidence that the engine will start, cold start features 426 and after treatment features 428 may be activated, calibrated, or otherwise controlled (e.g., via control signals transmitted over connection 432). Additionally, in some embodiment, other devices or features 430 may be activated, calibrated, or otherwise controlled based on the confidence level that the engine of vehicle 410 will start soon thereafter. For example, various passenger comfort features (e.g., heating/cooling/air filtration devices, etc.) may be controlled. System 400 may also include any additional networking components necessary to communicate with external configuration/control systems (e.g., Wi-Fi networking components, radiofrequency components, COM ports, etc.).

In general, the routines executed to implement the embodiments may be implemented as part of an operating system or a specific application, module, or sequence of instructions. In certain embodiments, controller 402 includes one or more modules structured to functionally execute the operations of controller 402 to predict intent to drive vehicle 410. The description herein including modules emphasizes the structural independence of the aspects of the controller 402, and illustrates one grouping of operations and responsibilities of the controller 402. More specific descriptions of certain embodiments of controller 402 operations are described by the sections herein referencing FIGS. 1-3. Other groupings that execute similar overall operations are understood within the scope of the present application. The modules typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks, flash memory, among others.

Example and non-limiting module implementation elements include the sensors, systems, and/or connections required to allow controller 402 to communicate with and monitor devices (e.g., door latch sensors, ignition switch sensors, security systems, etc.) of the vehicle to detect indicators as discussed herein (e.g., indicators 412-424). Such devices each may be communicably coupled to controller 402 and provide any value determined herein. Example and non-limiting module implementation elements may further include devices for providing any value that is a precursor to a value determined herein, data links and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method comprising:
    detecting, using a processing device, a sequence comprising a plurality of indicators, wherein each indicator suggests an intent to drive a vehicle;
    determining a separation time between each of the indicators of the sequence;
    comparing the sequence and determined separation times to historical data, wherein the historical data comprises data related to previously stored separation times of the sequence;
    determining, based on the comparison, a confidence level that an engine of the vehicle will be started; and
    activating, based on the confidence level, a feature of the vehicle.

2. The method of claim 1, wherein activating the feature comprises controlling an amount of energy provided to a cold start feature of the vehicle.

3. The method of claim 2, wherein the feature includes at least one of a glow plug of the engine, a heater of the engine, or a heater of an exhaust system of the vehicle.

4. The method of claim 2, wherein the confidence level determines the amount of energy provided to the cold start features.

5. The method of claim 1, further comprising activating, based on the confidence level, an aftertreatment device of the vehicle, wherein the aftertreatment device is configured to treat an exhaust of the engine.

6. The method of claim 1, wherein the historical data comprises a table of data records for a plurality of indicator sequences, wherein a data record for a particular indicator sequence comprises at least one of a maximum time separation between each indicator of the particular indicator sequence, a minimum time separation between each indicator of the particular indicator sequence, a mean time separation between each indicator of the particular indicator sequence, and a count of how many times the particular indicator sequence was previously detected.

7. The method of claim 1, wherein the plurality of indicators comprise at least one of a remote key status of the vehicle, a driver door of the vehicle opening, the driver door of the vehicle closing, an ignition key switch status of the vehicle, a driver seatbelt buckle status of the vehicle, and a detected weight on a seat of the vehicle.

8. The method of claim 1, wherein detecting the sequence of a plurality of indicators comprises monitoring signals of a CAN bus of the vehicle to detect the sequence.

9. A system comprising:
one or more computing devices configured to:
    detect a sequence comprising a plurality of indicators, wherein each indicator suggests an intent to drive a vehicle;
    determine a separation time between each of the indicators of the sequence;
    compare the sequence and determined separation times to historical data, wherein the historical data comprises data related to previously stored separation times of the sequence;
    determine, based on the comparison, a confidence level that an engine of the vehicle will be started; and
    activate, based on the confidence level, a feature of the vehicle.

10. The system of claim 9, wherein activating the feature comprises controlling an amount of energy provided to a cold start feature of the vehicle.

11. The system of claim 10, wherein the feature includes at least one of a glow plug of the engine, a heater of the engine, or a heater of an exhaust system of the vehicle.

12. The system of claim 10, wherein the confidence level determines the amount of energy provided to the cold start features.

13. The system of claim 9, further comprising activating, based on the confidence level, an aftertreatment device of the vehicle, wherein the aftertreatment device is configured to treat an exhaust of the engine.

14. The system of claim 9, wherein the historical data comprises a table of data records for a plurality of indicator sequences, wherein a data record for a particular indicator sequence comprises at least one of a maximum time separation between each indicator of the particular indicator sequence, a minimum time separation between each indicator of the particular indicator sequence, a mean time separation between each indicator of the particular indicator sequence, and a count of how many times the particular indicator sequence was previously detected.

15. The system of claim 9, wherein the plurality of indicators comprise at least one of a remote key status of the vehicle, a driver door of the vehicle opening, the driver door of the vehicle closing, an ignition key switch status of the vehicle, a driver seatbelt buckle status of the vehicle, and a detected weight on a seat of the vehicle.

16. The system of claim 9, wherein detecting the sequence of a plurality of indicators comprises monitoring signals of a CAN bus of the vehicle to detect the sequence.

17. A method comprising:
detecting, using a processing device, a sequence comprising a plurality of indicators, wherein each indicator suggests an intent to drive a vehicle;
determining a separation time between each of the indicators of the sequence;
determining whether the sequence has a corresponding entry in historical data, wherein the historical data comprises data related to previously stored separation times of stored sequences;
responsive to determining that the sequence does not have an entry in the historical data, inserting the sequence in the historical data.
responsive to determining that the sequence has an entry in the historical data, updating the historical data of the sequence based on the determined separation time between each of the indicators of the sequence;
determining, based on the sequence, a confidence level that an engine of the vehicle will be started; and
activating, based on the confidence level, a feature of the vehicle.

18. The method of claim 17, wherein activating the feature comprises controlling an amount of energy provided to a cold start feature of the vehicle.

19. The method of claim 17, further comprising activating, based on the confidence level, an aftertreatment device of the vehicle, wherein the aftertreatment device is configured to treat an exhaust of the engine.

20. The method of claim 17, further comprising deleting, historical data related to the sequence, wherein in the historical data that is deleted is based on an age of the historical data that is deleted.

* * * * *